US012703597B2

(12) United States Patent
Obata et al.

(10) Patent No.: US 12,703,597 B2
(45) Date of Patent: Aug. 11, 2026

(54) PRINTING MEDIUM ACCOMMODATING APPARATUS AND PRINTING APPARATUS

(71) Applicant: CANON KABUSHIKI KAISHA, Tokyo (JP)

(72) Inventors: Tsutomu Obata, Tokyo (JP); Ryo Kobayashi, Kanagawa (JP); Ryo Harigae, Tokyo (JP); Itaru Wada, Kanagawa (JP); Kengo Nieda, Kanagawa (JP); Kohei Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/154,740

(22) Filed: Jan. 13, 2023

(65) Prior Publication Data

US 2023/0249936 A1 Aug. 10, 2023

(30) Foreign Application Priority Data

Feb. 8, 2022 (JP) ................................ 2022-017843

(51) Int. Cl.
*B65H 31/22* (2006.01)
*B41J 11/58* (2006.01)

(52) U.S. Cl.
CPC .............. *B65H 31/22* (2013.01); *B41J 11/58* (2013.01)

(58) Field of Classification Search
CPC . B65H 2701/11312; B65H 31/22; B41J 11/58
See application file for complete search history.

(56) References Cited

U.S. PATENT DOCUMENTS

| | | | | | |
|---|---|---|---|---|---|
| 7,997,578 | B2 * | 8/2011 | Saito | B65H 31/22 271/213 |
| 12,024,386 | B2 * | 7/2024 | Ramis Llinares | B65H 31/22 |
| 2015/0301493 | A1 * | 10/2015 | Sawai | G03G 15/6514 399/393 |
| 2017/0090400 | A1 | 3/2017 | Maruyama et al. | B41J 2/165 |

(Continued)

FOREIGN PATENT DOCUMENTS

| | | |
|---|---|---|
| JP | 2001-002307 | 1/2001 |
| JP | 2003-252514 A | 9/2003 |

(Continued)

OTHER PUBLICATIONS

U.S. Appl. No. 18/178,219, filed Mar. 3, 2023.

(Continued)

*Primary Examiner* — Howard J Sanders
(74) *Attorney, Agent, or Firm* — Venable LLP

(57) ABSTRACT

In a printing medium accommodating apparatus, a printing medium discharged from a discharge port of a printing apparatus is stacked. The printing medium accommodating apparatus includes: a receiving member configured to receive a printing medium discharged from the discharge port; and a holding member having a holding portion configured to hold one end of the receiving member, the holding member being capable of being connected with a first attachment unit attached to the printing apparatus, the holding member being configured to be capable of transitioning from a first state where the holding member is connected with the first attachment unit to a second state where the holding member is separated from the first attachment unit.

21 Claims, 12 Drawing Sheets

(56) References Cited

U.S. PATENT DOCUMENTS

| | | | | |
|---|---|---|---|---|
| 2018/0329350 | A1 | 11/2018 | Sugiyama et al. ..... | G03G 15/00 |
| 2023/0249935 | A1* | 8/2023 | Kobayashi ............. | B65H 31/02<br>271/207 |

FOREIGN PATENT DOCUMENTS

| | | | |
|---|---|---|---|
| JP | 2007-112580 | A | 5/2007 |
| JP | 2011-032045 | A | 2/2011 |
| WO | 2021/091568 | A | 5/2021 |

OTHER PUBLICATIONS

U.S. Appl. No. 18/178,210, filed Mar. 3, 2023.
Office Action dated Sep. 30, 2025, in Japanese Patent Application No. 2022-017843.

* cited by examiner

PRINTING MEDIUM ACCOMMODATING APPARATUS AND PRINTING APPARATUS

BACKGROUND OF THE INVENTION

Field of the Invention

The present disclosure relates to a printing medium accommodating apparatus and a printing apparatus.

Description of the Related Art

A printing medium accommodating apparatus in which to stack a printing medium discharged from a discharge port is known. In a case of using a rolled printing medium, it is difficult to discharge the printing medium to a straight discharge tray. For this reason, for example, a configuration in which a printing medium is received by using a sheet member made of a cloth or the like is known (Japanese Patent Laid-Open No. 2001-2307 (hereinafter referred to as Document 1)).

Document 1 discloses a configuration in which the printing medium accommodating apparatus includes front rods extending obliquely forward from below a printing apparatus supported on a stand and rear rods extending obliquely rearward therefrom, a sheet member is held by the front and rear rods, and the sheet member takes on a U shape. A printing medium discharged is discharged along the sheet member having the U shape.

The printing medium accommodating apparatus described in Document 1 is configured on the premise that there is a stand which supports the printing apparatus. For this reason, the setting position is limited to positions where the stand can be placed. In addition, in a case of a printing medium accommodating apparatus that can be employed for a printing apparatus that does not have a stand and is used on a desktop, since an accommodating portion configured to accommodate the discharged medium is disposed outside the desk end portion, there is a possibility that the user comes into contact with the accommodating portion, and the accommodating portion is broken due to a load of the contact.

SUMMARY OF THE INVENTION

A printing medium accommodating apparatus according to one aspect of the present disclosure is a printing medium accommodating apparatus in which to stack a printing medium discharged from a discharge port of a printing apparatus, comprising:

- a receiving member configured to receive a printing medium discharged from the discharge port; and
- a holding member having a holding portion configured to hold one end of the receiving member, the holding member being capable of being connected with a first attachment unit attached to the printing apparatus, the holding member being configured to be capable of transitioning from a first state where the holding member is connected with the first attachment unit to a second state where the holding member is separated from the first attachment unit.

Further features of the present invention will become apparent from the following description of exemplary embodiments with reference to the attached drawings.

DESCRIPTION OF THE EMBODIMENTS

Hereinafter, preferred embodiments of the present disclosure are described in detail with reference to the attached drawings. Note that the following embodiments are not intended to limit the matters of the present disclosure, and it is not necessarily that all of the combinations of features described in the following embodiments are essential for the solution of the present disclosure. Note that the same constituent elements are denoted by the same reference signs.

First Embodiment

In the present embodiment, a printing medium accommodating apparatus which can be attached to a large-format printing apparatus which is placed on a desktop is described. If a printing medium is discharged from a large-format printing apparatus placed on a desktop without a printing medium accommodating apparatus, the printing medium is discharged on the desktop as it was. In this case, since the printing medium discharged on the desktop stays there, there is a high possibility that when the printing of the next page completes, printing media come into contact with each other, so that the surfaces thereof are scratched, or jamming occurs. In addition, it can be considered to place a printing apparatus at an end portion of a desktop so that a printing medium falls by its weight in order that sheets discharged do not stay. However, in this case, although jamming as described above can be avoided, there is also a high possibility that the surface of the printing medium is scratched as well due to the fall. For this reason, it is necessary for the user to carefully receive printing media one by one during the discharge, which is inconvenient.

In view of this, in the present embodiment, a mode for using a printing medium accommodating apparatus which can be attached to a printing apparatus placed on a desktop is described. Then, a mode for suppressing occurrence of breakage in a case where the user comes into contact with an accommodating portion is described.

<Entire Configuration>

Figure 1:
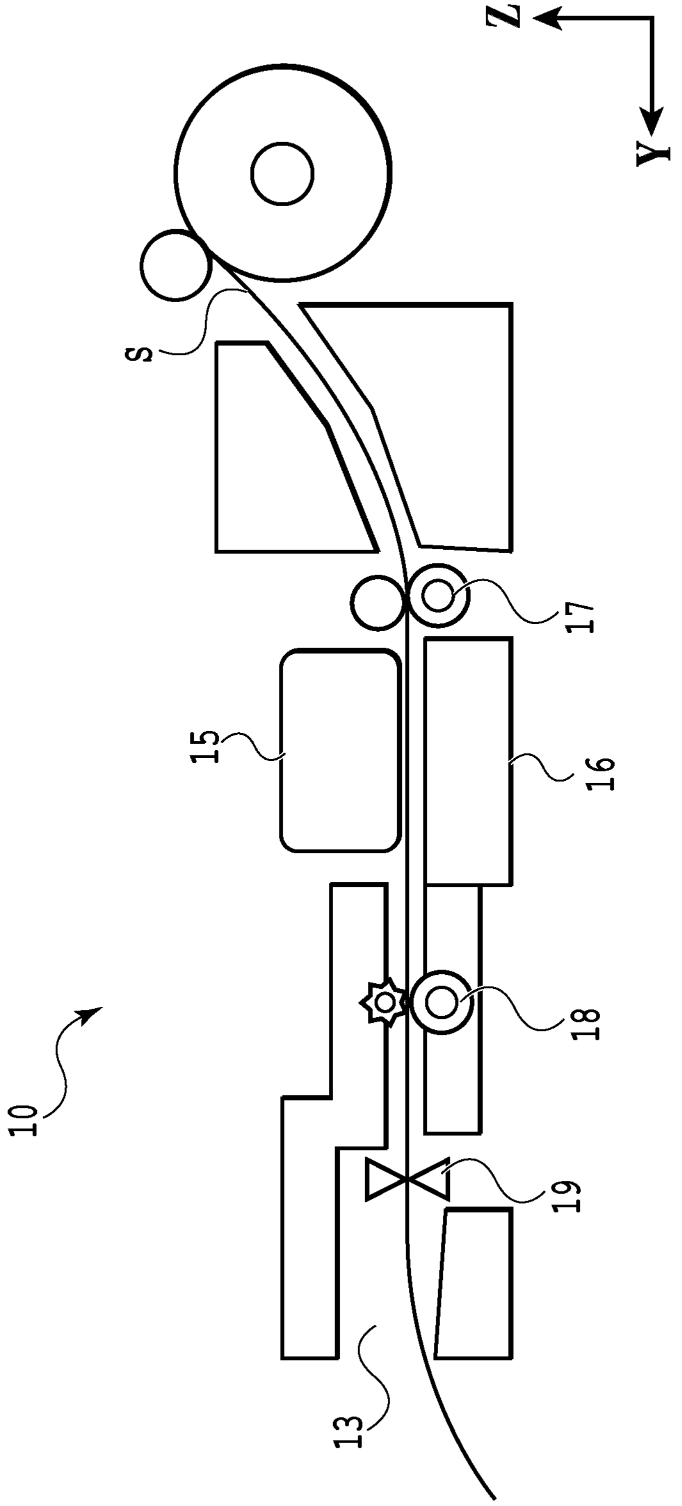
FIG. 1 is a diagram for schematically explaining an example of an entire configuration of a printer.

FIG. 1 is a diagram for schematically explaining an example of an entire configuration of a printer 10, which is a printing apparatus of the present embodiment. A printing medium S wound in a roll passes through a sheet feeding port, and is conveyed by a conveyance roller 17 to a printing area where printing is performed by a printing head 15. Hereinafter, the direction in which the printing medium is conveyed is referred to as a +Y direction. In addition, the direction of gravity is referred to as a −Z direction, and the direction (sheet-width direction) in which a printing medium is cut by a cutter, which is described later, is referred to as +X direction (see FIG. 2). In the printing head 15, a plurality of ejecting ports configured to eject ink are formed. The ink is ejected by the printing head 15 onto the conveyed printing medium S, so that an image is formed thereon. The printing medium on which the image has been printed is conveyed further downstream by a discharge roller 18 provided downstream of the printing head 15. Once the printing operation is completed, the printing medium S is conveyed such that the sheet-cutting position coincides with the position of the cutter 19 by the conveyance roller 17 and the discharge roller 18. Thereafter, the cutter 19 moves in the sheet-width direction (+X direction) to cut the printing medium S on which the image has been printed, and the printing medium S thus cut is discharged through the discharge port 13 to the outside of the apparatus.

Figure 2:
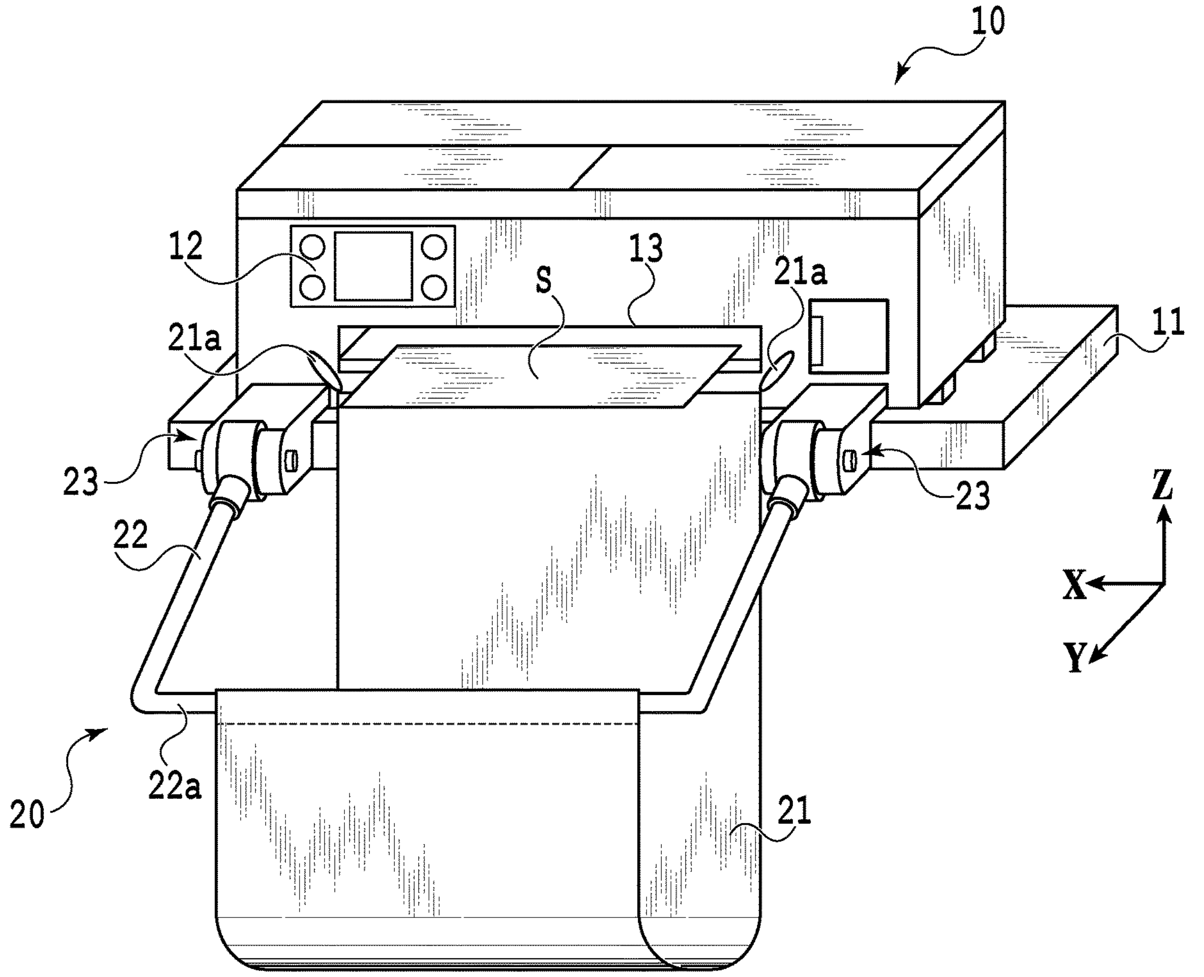
FIG. 2 is a diagram schematically showing a printing medium accommodating apparatus and the printer.

FIG. 2 is a diagram schematically showing a printing medium accommodating apparatus 20 of the present embodiment and the printer 10, which is a printing apparatus. FIG. 2 shows a schematic perspective view of a state where the printing medium accommodating apparatus 20 is mounted on the printer 10. The embodiment is further described with reference to FIG. 1 and FIG. 2.

The printer 10 is a desktop-type printer placed on the ground face on a desk 11. In other words, the printer 10 is a printer that does not have stands (legs) having such a length that allows an accommodating cloth 21, which is a receiving member described later, to be included below the printer. The printer 10 includes the discharge port 13 from which to discharge the printing medium S on which the image has been formed, and the printing medium S discharged from the discharge port 13 is accommodated in the printing medium accommodating apparatus 20 placed below the discharge port 13 (in the direction of gravity −Z direction).

The printing medium accommodating apparatus 20 includes the accommodating cloth 21, a rod member 22, and attachment units 23. The printing medium accommodating apparatus 20 is attached to a face of the printer 10 on the side where the discharge port 13 is provided. The downstream end portion (the end portion in the +Y direction) of the accommodating cloth 21 is sewn while being bent to be formed in a bag shape. The rod member 22, which is a holding member, has an angular U shape with two bent portions, and the rod member 22 is passed through the bag shape of the accommodating cloth 21, so that the accommodating cloth 21 and the rod member 22 are integrated. The bag shape of the accommodating cloth 21 is placed on a side (a holding portion 22*a*) between the two bent portions of the rod member 22. In addition, the upstream end portion (the end portion in the −Y direction) of the accommodating cloth 21 is configured to be capable of being mounted on the printer 10.

Since the printing medium accommodating apparatus 20 includes the attachment units 23, it is possible to attach the printing medium accommodating apparatus 20 to the printer 10 by using the attachment units 23 after the printer 10 is placed on any desired ground face. Once the printing medium accommodating apparatus 20 is attached to the printer 10 by using the pair of attachment units 23, the accommodating cloth 21 turns into a sheet member having a substantially U shape as viewed from the side of the printing medium accommodating apparatus 20. The printing medium S discharged from the discharge port 13 of the printer 10 is accommodated in the accommodating cloth 21. This sheet member having the substantially U shape serves as an accommodating portion to accommodate the discharged printing medium S.

<Attachment Unit>

Figures 3A, 3B, 3C, 3D:
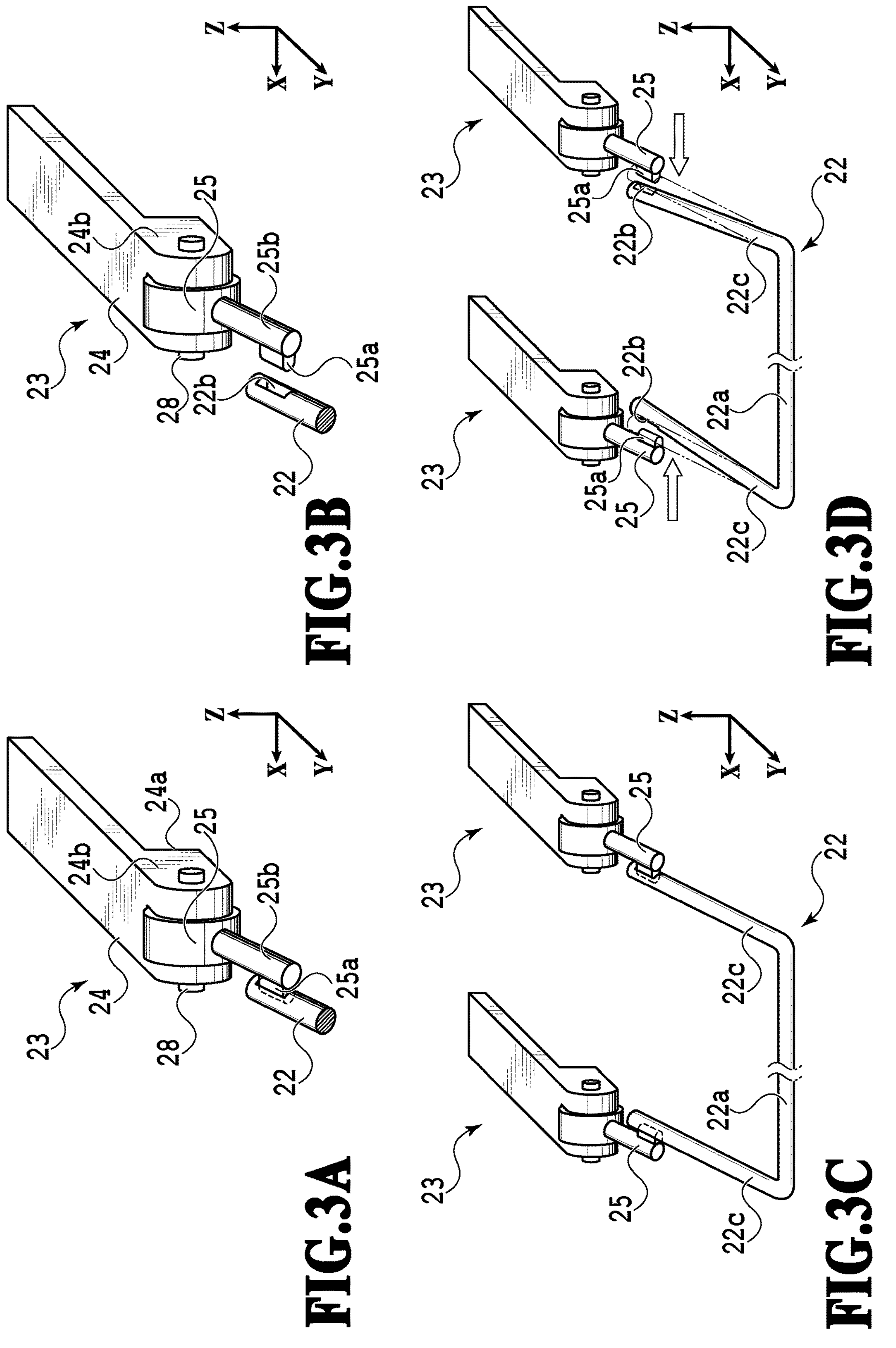
FIGS. 3A to 3D are each a perspective view showing a rod member and an attachment unit.
Figure 4B:
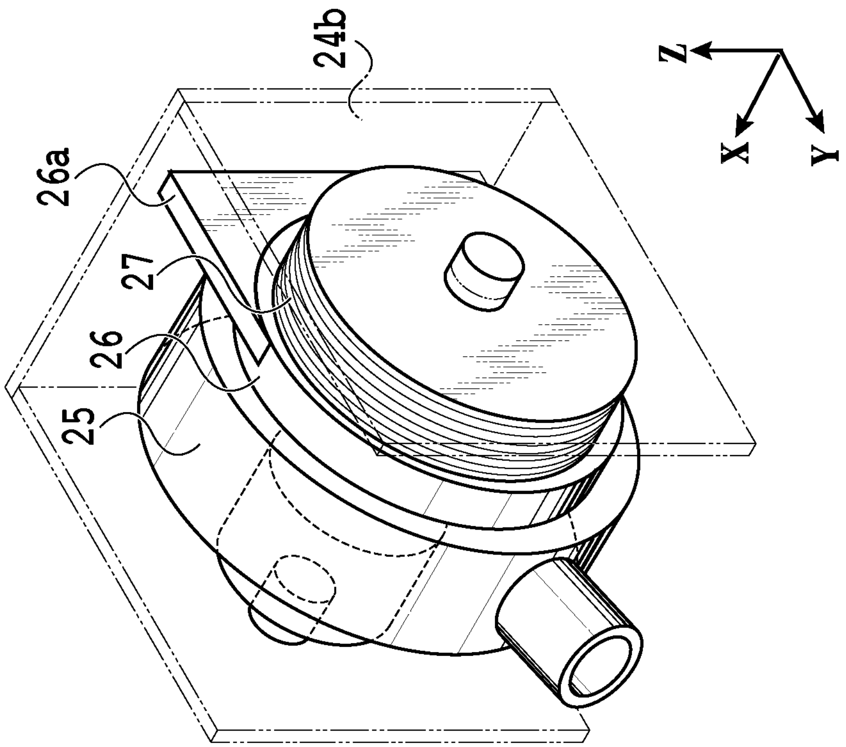
FIGS. 4A and 4B are each a diagram for explaining an internal structure of the attachment unit.
Figure 4A:
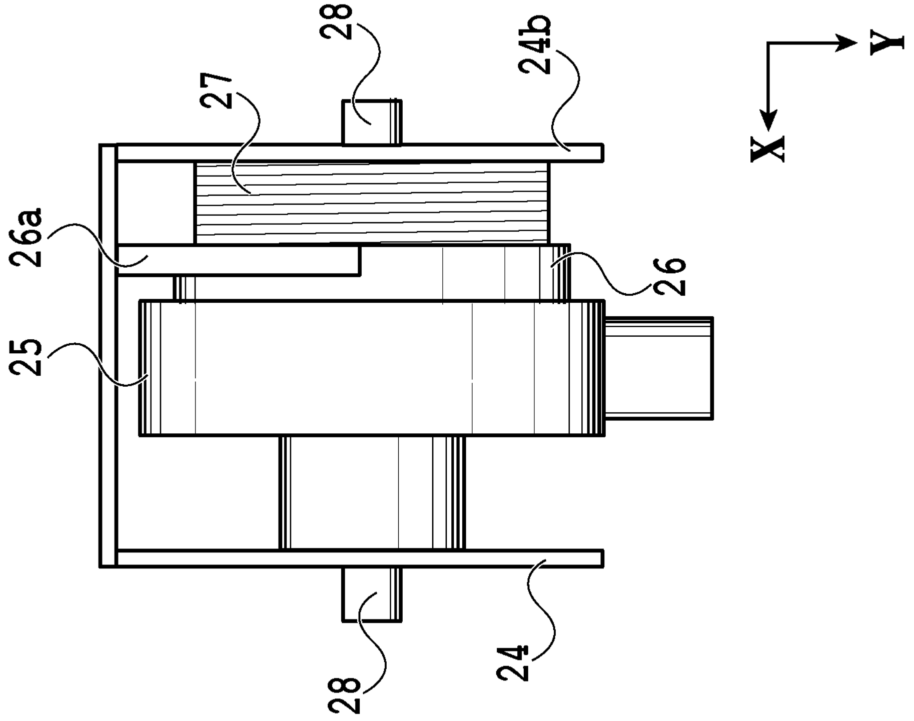

FIGS. 3A to 3D are each a perspective view of the attachment unit 23. FIGS. 4A and 4B are each a diagram for explaining an internal structure of the attachment unit 23. More specifically, FIG. 3A is a perspective view of the attachment unit 23 in a state where a front end (an end portion on an opposite side to the holding portion 22*a* which is an end portion configured to be attached to the attachment unit 23) of the rod member 22 is attached to the attachment unit 23. FIG. 3B is a perspective view of a state where the front end of the rod member 22 is removed from the attachment unit 23. FIG. 3C is a perspective view of a state where the attachment unit 23 and the rod member 22 are attached. FIG. 3D is a perspective view of a state where the rod member 22 is removed from the attachment unit 23. FIG. 4A is a top view showing through an inside of the attachment unit 23, and FIG. 4B is a perspective view showing through the inside of the attachment unit 23. A detailed configuration of the attachment unit 23 is described by using FIGS. 3A to 3D and FIGS. 4A and 4B. Note that in order to distinguish the attachment unit 23 from the configuration in which the accommodating cloth 21 is attached to the printer 10, which is described later, the attachment unit 23 is also referred to as a first attachment unit.

The attachment unit 23 includes an insertion member 24 having a shape to be inserted into a main body, and a turning member 25 configured to be capable of turning while holding an end portion of the rod member 22. In addition, the attachment unit 23 includes a sliding member 26 (a pressing member) configured to press a side face of the turning member 25, an elastic member 27 (a spring member) configured to press the sliding member 26, and a rotation shaft 28 attached in the center of turning of the turning member 25.

The insertion member 24 has, on the main body side of the printer 10, insertion shapes configured to fit into insertion slots 14 (see FIG. 5) of the printer 10. In addition, a lower portion of the insertion shape is provided with an abutting portion 24*a* configured to abut on the desk 11. In addition, the insertion member 24 includes a holder 24*b* having a hollow inside on the side opposite to the side where the insertion shape is formed, and contains the turning member 25, the sliding member 26, the elastic member 27, and the rotation shaft 28 inside the holder 24*b*. More specifically, the elastic member 27, the turning member 25, and the sliding member 26 in a compressed state is incorporated inside the holder 24*b*. The sliding member 26 is incorporated in the holder 24*b* such that the sliding member 26 is biased against the turning member 25 by the elastic member 27. When the turning member 25 is about to turn, since the turning member 25 is receiving side pressure from the sliding member 26 biased by the elastic member 27, the rod member 22 is held at a free angle by the frictional force. Note that the sliding member 26 includes a restricting face 26*a* configured to restrict the turning so that the sliding member 26 would not turn together with the turning member 25. In the case where the turning member 25 turns as well, since the restricting face 26*a* is in contact with the holder 24*b*, the sliding member 26 does not turn and can hold the posture.

Here, the frictional force is a force stronger than a force by which the rod member 22 descends with its weight. The frictional force can be adjusted by adjusting the pressing force by the elastic member 27 and the coefficient of friction at the sliding face between the sliding member 26 and the turning member 25.

The turning member 25 includes a protruding portion 25*a*. More specifically, the turning member 25 includes a supporting portion 25*b* in a direction containing at least the component in the Y direction (discharge direction) in a state where the attachment unit 23 is attached to the printer 10. The protruding portion 25*a* is formed on the side face of the supporting portion 25*b*. The pair of attachment units 23 used respectively on the left and right sides of the printer 10 are symmetrically formed such that the protruding portions 25*a* protrude in directions of facing each other. In addition, in the left and right front ends of the rod member 22, opening portions 22*b* are formed respectively (FIG. 3B). The protruding portions 25*a* of the turning members 25 are configured to be insertable into the opening portions 22*b* of the rod member 22, respectively.

The rod member 22 and the turning members 25 are held only by the opening portions 22*b* of the rod member 22 being fitted onto the protruding portions 25*a* of the turning members 25 without using a screw or the like. Then, as shown in FIG. 3B and FIGS. 3D, the rod member 22 is configured to be separated from the turning members 25 when an external force is applied to the rod member 22 in the directions of arrows. Specifically, as shown in FIGS. 3D, the rod member 22 is configured to be elastically deformable about the bent portions at the roots as fulcrums. That is, the rod member 22 is configured to be elastically deformable about the joint portions between the holding portion 22*a* and connecting portions 22*c* extending respectively from end portions of the holding portion 22*a* toward the attachment units 23 as fulcrums. For this reason, when forces are applied in the directions of arrows as shown in FIGS. 3B and 3D, the opening portions 22*b* of the rod member 22 are separated from the protruding portions 25*a* of the turning members 25 as shown in FIGS. 3B and 3D. The directions of arrows each contain a component in a direction which is, as viewed from one of the attachment units 23, directed to an opposite one of the pair of attachment units 23. On the other hand, against force in the directions opposite to the arrows shown in FIGS. 3B and 3D, the rod member 22 is not separated but maintains the state of being supported. That is, the rod member 22 is not separated from the turning members 25 for the force containing the component of the direction which is, as viewed from one attachment unit of the pair of attachment units 23, opposite to the direction toward an opposite attachment unit of the pair of attachment units 23. In a case where the user attaches the rod member 22 to the attachment units 23 (that is, the turning members 25), attaches the rod member 22 from inner sides by deforming the rod member 22, which makes it possible to easily set the printing medium accommodating apparatus 20. Since the rod member 22 is configured not to be separated by the force directed from the inner side to the outer side of the accommodating portion, it is possible to maintain the state where the rod member 22 is not separated from attachment units 23 during normal use.

<Accommodating Cloth>

Figure 5:
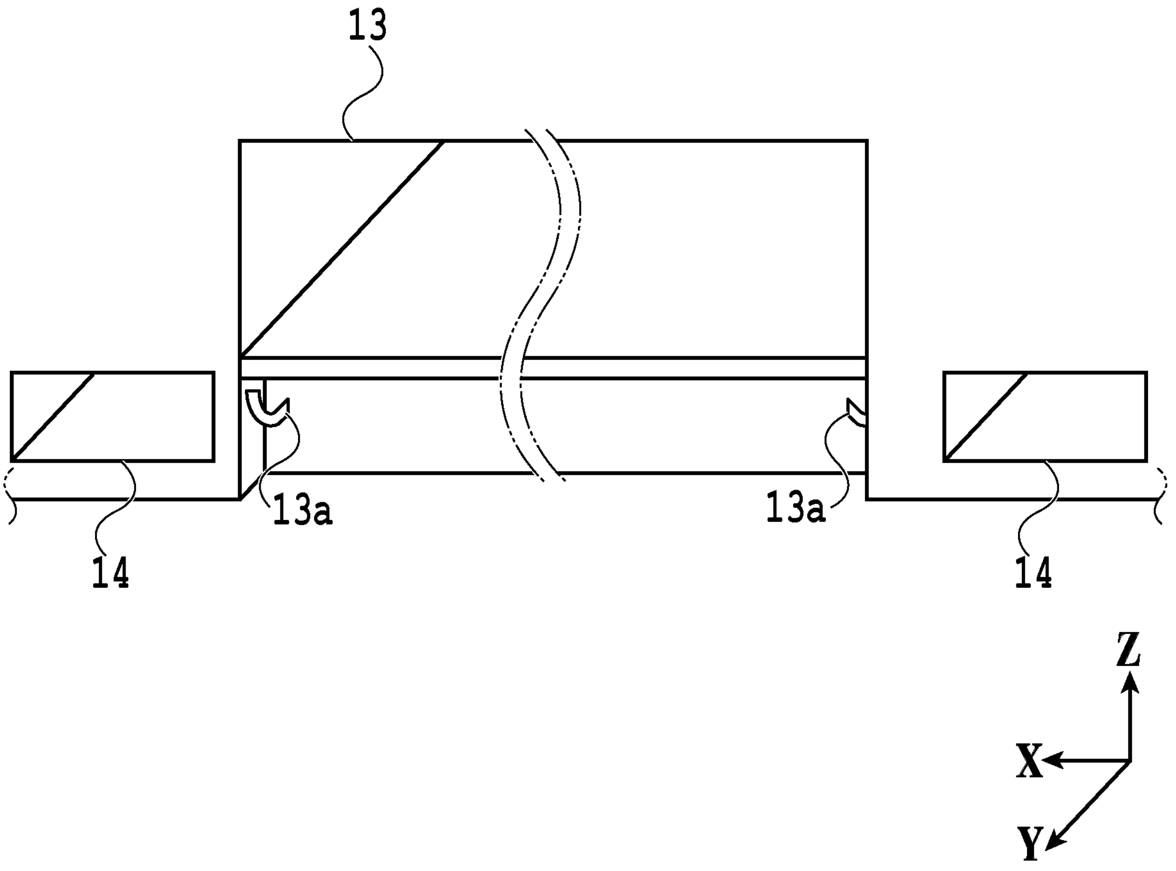
FIG. 5 is a diagram for explaining attachment of an accommodating cloth.
Figure 6:
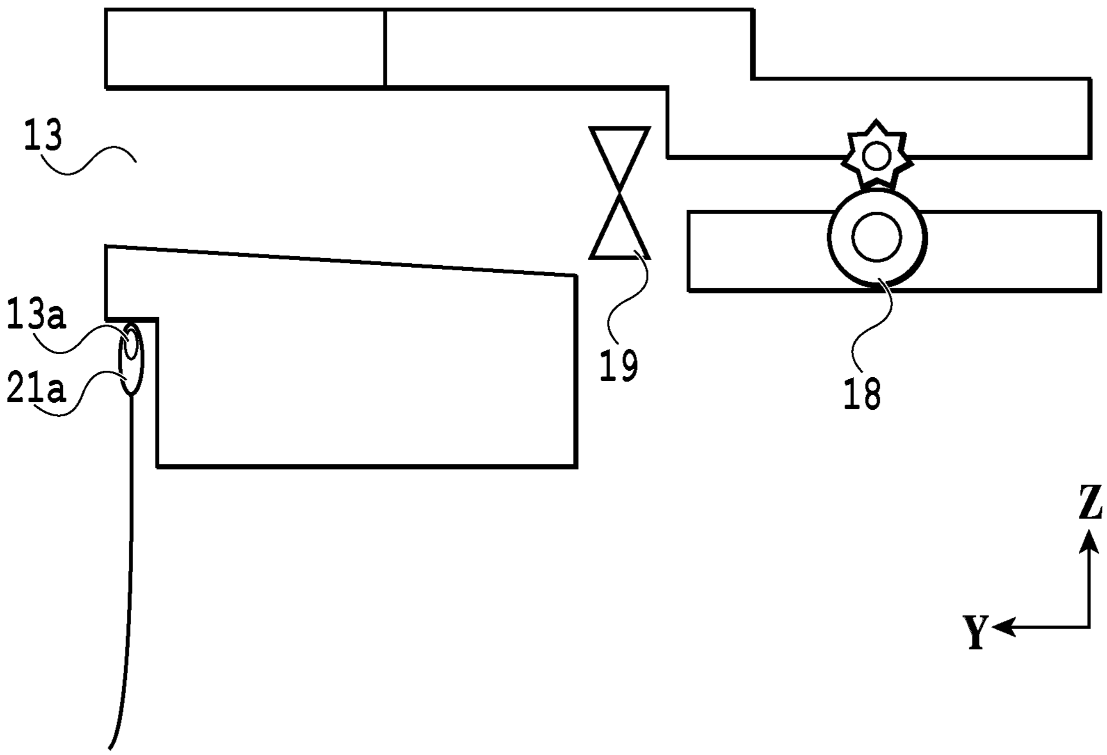
FIG. 6 is a cross-sectional view for explaining the attachment of the accommodating cloth.

FIG. 5 is a diagram for explaining attachment of the accommodating cloth 21, which is the sheet member. FIG. 6 is a cross-sectional view for explaining the attachment of the accommodating cloth 21. The attachment of the accommodating cloth 21 is described with reference to FIG. 5 and FIG. 6.

As described above, the accommodating cloth 21 has the bag shape formed across the entire face in the width direction at one end portion thereof. On the other hand, on the opposite end portion of the accommodating cloth 21, hanging strings 21*a* each having a ring shape are stitched to both end portions in the width direction. In addition, in the main body of the printer 10, hooks 13*a* are arranged at both outer sides of the discharge port 13 in the width direction and below the discharge port 13. The accommodating cloth 21 is configured to be attached to the main body of the printer 10 by hanging the hanging strings 21*a* of the accommodating cloth 21 on the hooks 13*a*, respectively. As shown in FIG. 5 and FIG. 6, the lower portion of the discharge port 13 has a shape depressed on the side opposite to the discharge direction (on the printer main body side), and the hooks 13*a* are provided in the depressed portion. The configuration in which the opposite end of the accommodating cloth 21 opposite to the one end which is held by the rod member 22 can be attached to the printer main body side, like the hanging strings 21*a* is referred to as a second attachment unit.

In a case where the accommodating cloth 21 is attached to the main body of the printer 10, the accommodating cloth 21 hung on the hooks 13*a* is preferably attached such that no gap is formed between the accommodating cloth 21 and the main body of the printer 10. This is because if there is a gap between the printer 10 and the accommodating cloth 21, there is a possibility that the leading end of the discharged printing medium S enters the gap to cause jamming. Hence, as shown in FIG. 5 and FIG. 6, by making a configuration in which a depressed step of several millimeters is provided on the printer 10 side and the accommodating cloth 21 is attached to the step, it is possible to prevent a gap from being generated. Note that in this example shown above, two hooks 13*a* in total are provide on the outer sides of the discharge port 13 in the width direction; however the configuration is not limited to this. The accommodating cloth 21 only has to be able to be attached as appropriate, and the positions and the number of the hooks 13*a* are not limited to the example shown in the drawings.

<Attachment of Attachment Unit to Printer>

Figure 7:
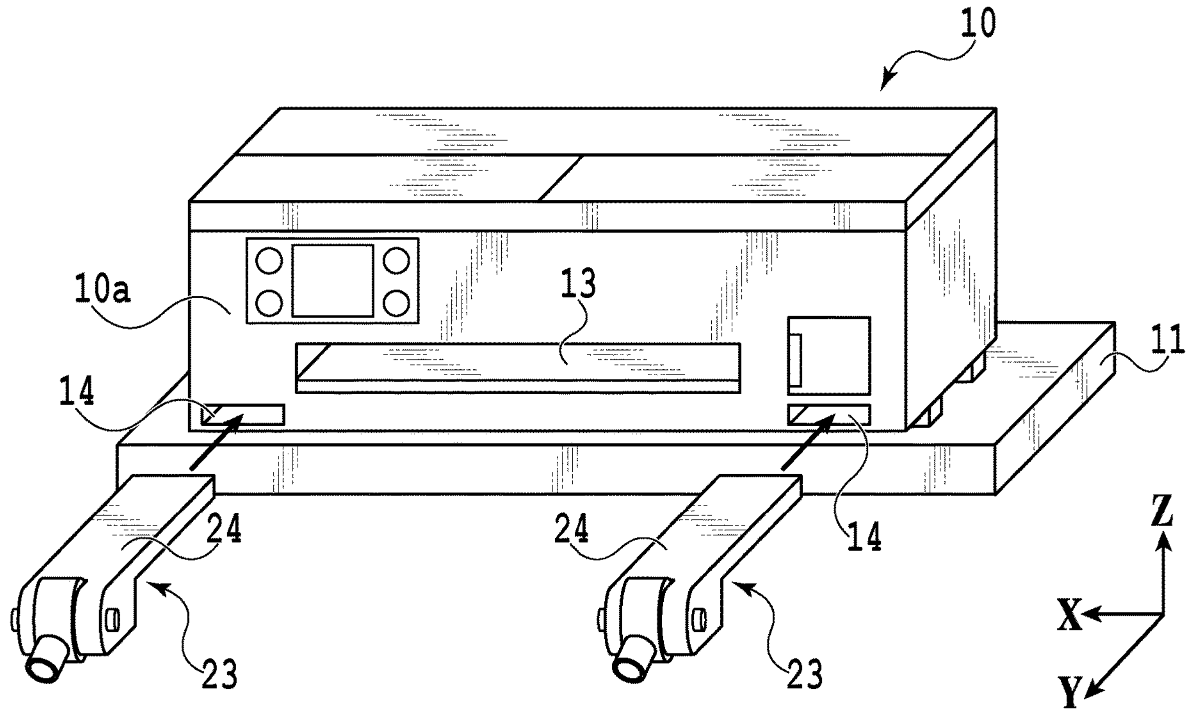
FIG. 7 is a perspective view for explaining an example of attaching the attachment unit to the printer.
Figure 8:
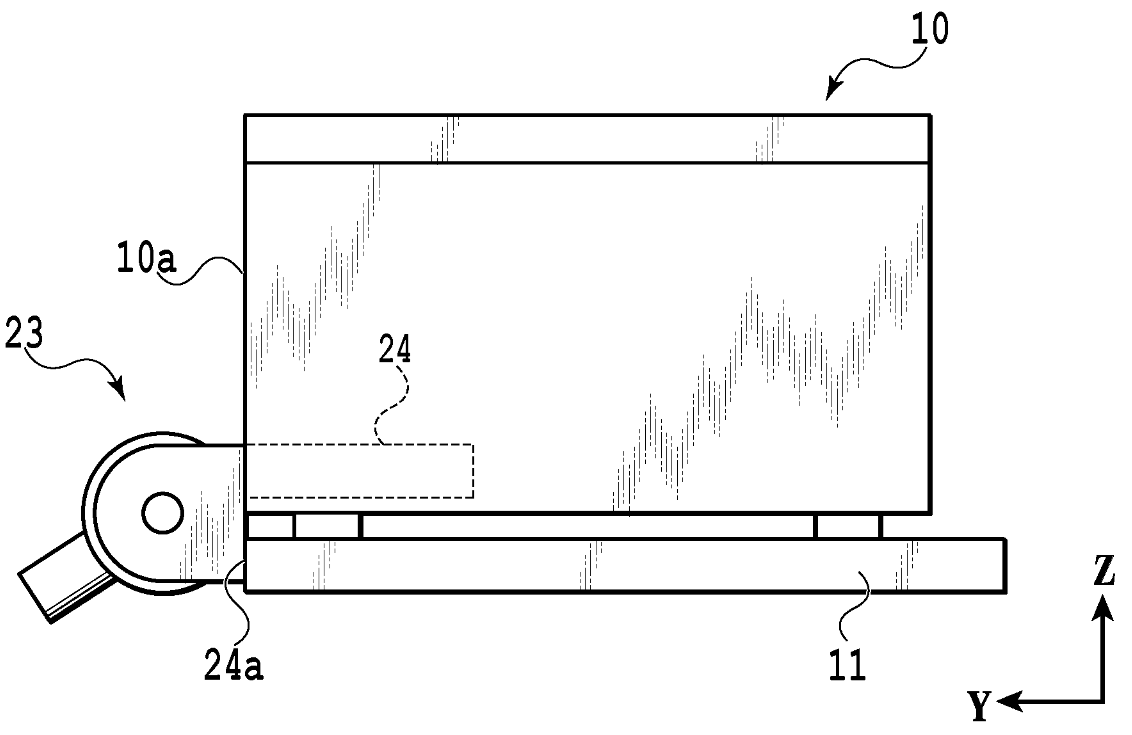
FIG. 8 is a side view for explaining the example of attaching the attachment unit to the printer.

FIG. 7 is a perspective view for explaining an example of attaching the attachment unit 23 to the printer 10. FIG. 8 is a side view for explaining the example of attaching the attachment unit 23 to the printer. The example in which the attachment unit 23 is attached to the printer 10 is described by using FIG. 7 and FIG. 8.

The insertion slots 14 are formed respectively on both outer side in the sheet-width direction of the discharge port 13 of the printer 10. The insertion members 24 of the attachment units 23 are inserted into the insertion slots 14. Note that although FIG. 7 shows an example in which the insertion slots 14 are formed below the discharge port 13, the positions are not limited to this. The attachment units 23 are attached to the insertion slots 14 of the printer 10 placed on the desk 11 provided at a desired position, so that the printing medium accommodating apparatus 20 is attached to the printer 10. The insertion slots 14 and the insertion members 24 are configured to be fitted to each other, and the attachment units 23 are fixed to the printer 10 by inserting the insertion members 24 into the insertion slots 14.

Here, as shown in FIG. 7 and FIG. 8, the printer 10 is preferably placed such that a front-face exterior 10*a* including the discharge port 13 is located close to the end portion of the desk 11. In this state, when the attachment units 23 are inserted deep into the insertion slot 14, the attachment units 23 are inserted until the abutting portions 24*a* of the insertion members 24 abut on the front-face exterior 10*a* including the discharge port 13 of the printer 10. That is, a positional relation is possible in which the abutting portions 24*a* also abut on the front end portion of the desk 11. In this way, in a case where the user accidentally applies downward static pressure to the attachment units 23, it is possible to support the attachment units 23 not only with the printer main body but also with the end portion of the desk 11, and to disperse the static pressure, so that breakage of the attachment units 23 can be suppressed. Note that the abutting portions 24*a* of the insertion members 24 can disperse static pressure as long as the abutting portions 24*a* abut on part of the face of the desk 11 on the end portion side, and the size of the abutting portions 24*a* is not limited to that shown in the drawings.

In addition, by placing the printer 10 at the end portion of the desk 11, it is also possible to suppress formation of a step between the discharge port 13 and the desk 11 in the Y direction. That is, it is possible to suppress generation of jamming due to a step. Note that although the printer 10 is preferably placed such that the front-face exterior 10*a* of the printer 10 becomes flush with the end portion of the desk 11, the printer 10 may be placed at a position displaced from the end portion of the desk 11 in connection with the shape of the end portion of the desk 11, or the like.

In this way, the printing medium accommodating apparatus 20 of the present embodiment can be mounted on the printer 10 by attaching the attachment units 23, and removed from the printer 10 by removing the attachment units 23. Hence, the printing medium accommodating apparatus 20 can be removed from the printer 10 in a case where the printing medium accommodating apparatus 20 is unnecessary, during transportation, and similar cases.

The method for mounting the printing medium accommodating apparatus 20 on the printer 10 by the user is as described below. First, the printer 10 is placed such that the front-face exterior 10*a* including the discharge port 13 is located close to the end portion of the desk 11. Thereafter, two sets of the attachment units 23 are inserted deep into the insertion slots 14. The bag-shaped portion of the folded stitch of the accommodating cloth 21 is passed onto the holding portion 22*a* of the rod member 22, and the hanging strings 21*a* on the opposite side are hung on the two hooks 13*a* of the printer 10. Then, the mounting of the printing medium accommodating apparatus 20 on the printer 10 is completed by fitting the opening portions 22*b* of the rod member 22 onto the protruding portions 25*a* of the turning members 25.

Note that although the example in which the user passes the bag-shaped portion of the folded stitch of the accommodating cloth 21 onto the holding portion 22*a* of the rod member 22 has been described, if the printing medium accommodating apparatus 20 is shipped in the state where the bag-shaped portion of the accommodating cloth 21 has already been passed onto the rod member 22 at the time of shipment, the number of steps of assembly conducted by the user can be reduced.

<Method for Using the Printing Medium Accommodating Apparatus>

Figure 9B:
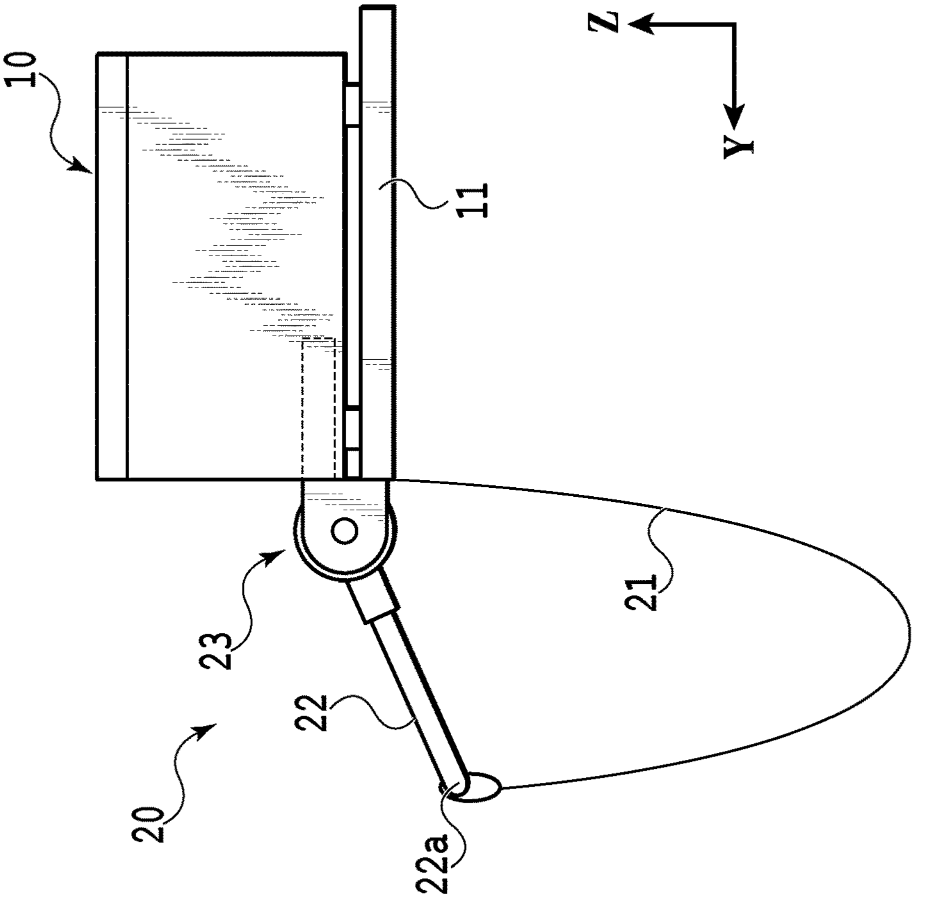
FIGS. 9A and 9B are each a side view for explaining a method for using the printing medium accommodating apparatus.
Figure 9A:
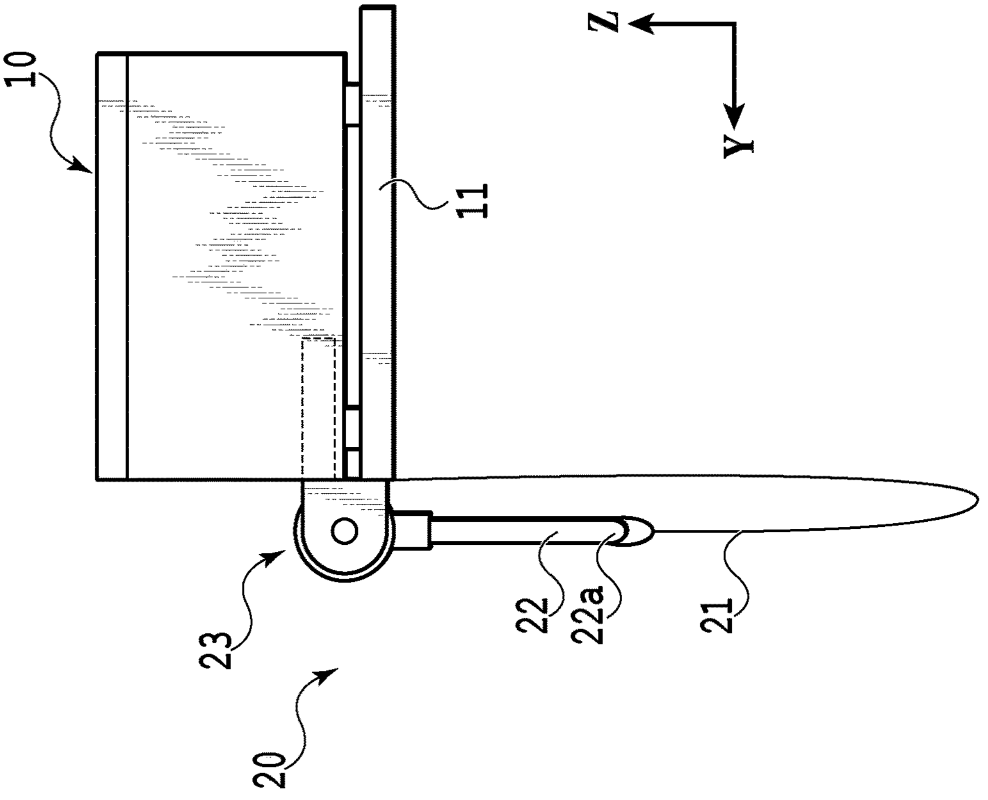

FIGS. 9A and 9B are each a side view for explaining the method for using the printing medium accommodating apparatus 20 mounted on the printer 10. FIG. 9A shows a storage position in a case where the printing medium accommodating apparatus 20 is not used. FIG. 9B shows a discharge position in a case where the printing medium accommodating apparatus 20 is used. FIGS. 9A and 9B each show a state where the accommodating cloth 21 is mounted on the rod member 22 and the printer 10, the attachment units 23 are attached to the printer 10, and the rod member 22 is mounted on the attachment units 23.

As described above, the rod member 22 and the turning members 25 are configured to be integrated by fitting the opening portions 22*b* of the rod member 22 onto the protruding portions 25*a* of the turning members 25. In addition, since the turning member 25 is receiving side pressure from the sliding member 26 which is biased by the elastic member 27, it is possible to fix the turning member 25 at a desired turned position. It is possible for the user to manually operate the holding portion 22*a* with the accommodating cloth 21 passed on the rod member 22 to turn the rod member 22 to a desired position. As shown in FIG. 9A, in a case where the printing medium accommodating apparatus 20 is not used, the rod member 22 is moved to the storage position. The storage position refers to a state where the rod member 22 extends downward (the state of the position pointing to "6" of a clock) as viewed from the side face of the printing medium accommodating apparatus 20 as shown in FIG. 9A. The reason why the printing medium accommodating apparatus 20 can be turned to the storage position is that the printer 10 and the printing medium accommodating apparatus 20 may be used at any desired setting position. In other words, it is assumed that the printer 10 is placed at the end portion of the desk 11 at any position in the present embodiment as described above. In this case, there is a case where the printing medium accommodating apparatus 20 occupies a passage of an office or the like depending on the setting environment of the user. The printing medium accommodating apparatus 20 of the present embodiment is configured such that the rod member 22 can be turned to and fixed at a desired position. Hence, in a case where the printing medium accommodating apparatus 20 is not used, it is possible to prevent the printing medium accommodating apparatus 20 from interrupting the action of the user by turning the rod member 22 to the storage position.

On the other hand, in a case where the printing medium accommodating apparatus 20 is used, the user turns the rod member 22 by manually operating and bringing up the rod member 22 to move the rod member 22 to the discharge position as shown in FIG. 9B. In this way, it is possible to accommodate the discharged printing medium S in the accommodating cloth 21 formed in a substantially U shape.

Note that the positions to which the rod member 22 can be turned are not limited to the example shown in FIGS. 9A and 9B. For example, the discharge position may be above or below the position shown in FIG. 9B. The position may be a position at which the holding portion 22*a* of the rod member 22 is located higher than the horizontal state. In any case, the position only has to be a position that allows the discharged printing medium to be accommodated.

<Discharge Position of Printing Medium Accommodating Apparatus>

Figure 10A:
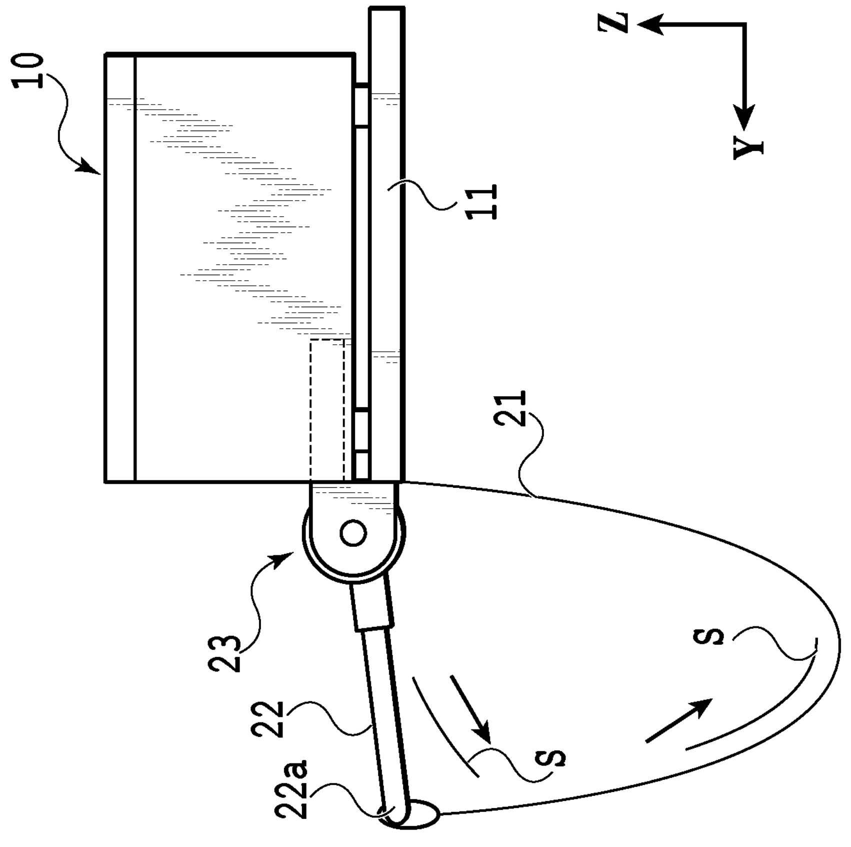
FIGS. 10A and 10B are each a diagram for explaining a discharge position.
Figure 10B:
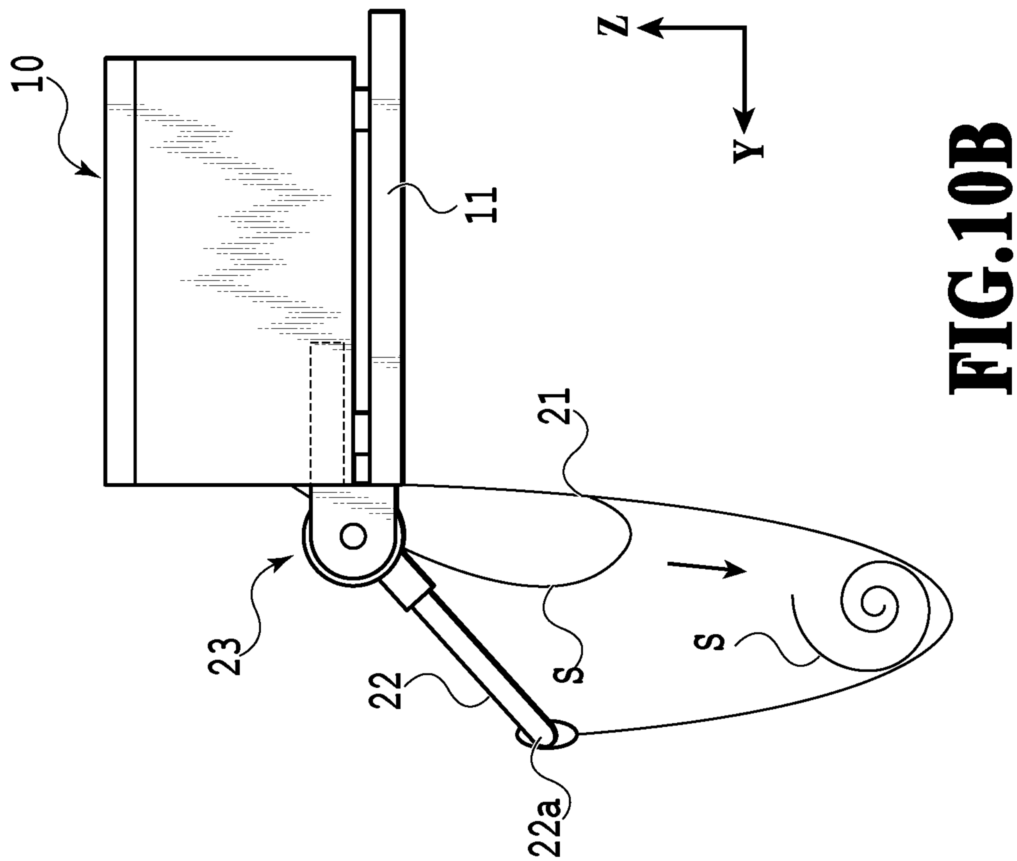

FIGS. 10A and 10B are each a diagram for explaining the discharge position of the printing medium accommodating apparatus 20. As described above, the rod member 22 is configured to be turnable to a desired position by means of the turning member 25. Here, an example in which the turn position to which the rod member 22 of the printing medium accommodating apparatus 20 is turned may be changed depending on a difference in printing conditions is described by using FIGS. 10A and 10B. FIG. 10A is a diagram showing a state where the rod member 22 has been moved to such a turn position that the position in the Y direction of the holding portion 22*a* of the rod member 22 on which the bag-shaped portion at the one end of the accommodating cloth 21 has been passed is more distant from the discharge port 13 than the position shown in FIG. 10B.

The behavior of the printing medium at the time of discharge can vary depending on the printing medium to be discharged. For example, in a case where a sheet of cut paper (A4, A3, or the like) or a sheet of strip paper cut short from a rolled medium is discharged, the printing medium is very light in weight and thus is largely affected by wind from an air conditioner in the room, or the like. For this reason, there is a case where the printing medium does not drop directly below but drops while drifting during dropping. In addition, in a case where an image having high printing duty is printed, cockling occurs in the printing medium, so that there is sometimes a case where the printing medium on which the image has been printed does not bend, and is discharged as it is. Under such printing conditions as described above, if the holding portion 22*a* of the rod member 22 is located at a position close to the printer 10 in the Y direction, there is a possibility that the printing medium is discharged beyond the rod member 22. For this reason, as shown in FIG. 10A, by setting the holding portion 22*a* of the rod member 22 at a turn position close to the horizontal state relative to the desk 11, it is possible to relatively elongate the length of the accommodating cloth 21 in the Y direction. This makes it possible to appropriately accommodate the discharged printing medium S in the printing medium accommodating apparatus 20.

On the other hand, in a case where a printing medium on which an image has been printed in a long size (A1, A0, or the like) from a rolled medium is discharged, the weight of the printing medium itself is also heavy, and is likely to curl. For this reason, the printing medium S discharged from the discharge port 13 is discharged while the leading end of the printing medium S is in contact with the accommodating cloth 21. In addition, because of its long length, as the depth of the printing medium accommodating apparatus 20 in the Z direction is deeper, the printing medium S is less likely to go beyond the printing medium accommodating apparatus 20, and thus can be discharged as appropriate. Hence, in a case where an image in a long size is printed, or similar cases, the printing medium accommodating apparatus 20 is used in a way that the position where the printing medium accommodating apparatus 20 can accommodate the printing medium S is made deeper by setting the position of the holding portion 22*a* of the rod member 22 to a turn position relatively closer to the printer 10 in the Y direction as shown in FIG. 10B.

Although the turn position of the rod member 22 has been described so far by giving specific examples of use, the above-described examples are mere examples. The discharging behavior varies depending on the sheet size, the length of the sheet, the printing pattern, the printing duty, the environment, and the like. For this reason, in the actual practice, the user changes the turn position of the rod member 22 to a position suitable for the printing conditions for use.

As described above, the present embodiment makes it possible to provide a printing medium accommodating apparatus that is applicable to a printing apparatus that can be placed at a desired position. That is, since the printer 10 of the present embodiment is a printer to be placed on the ground face of the desk 11, the degree of freedom in setting position is higher than the case of printers having stand legs. The printing medium accommodating apparatus 20 of the present embodiment can be attached to such a printer as to be placed on a desktop. By using the printing medium accommodating apparatus 20, it is possible to discharge a printing medium while avoiding damage and smear of the printing medium, and occurrence of jamming at the time of printing the next page. In addition, since the printing medium accommodating apparatus 20 is used at the end portion of the desk 11 during use, the user is likely to collide with the rod member 22 protruding to a passage or the like. However, in the present embodiment, since the rod member 22 is configured to be separated from the attachment units 23 in the case where the user collides with the rod member 22, it is possible to suppress occurrence of breakage in the attachment units 23 or the rod member 22.

Note that in the present embodiment, the example in which the left and right opening portions 22*b* of the rod member 22 and the protruding portions 25*a* of the turning members 25 have such shapes that the left and right components are symmetrical as shown in FIG. 3D has been described, the present disclosure is not limited to this. These do not necessarily have to be in symmetrical shapes as long as they are configured such that the rod member 22 is separated from the attachment units 23 in a case where force is applied to the rod member 22 from the outer side in the direction containing the component in the horizontal direction.

In addition, although the example in which the protruding portions 25*a* are provided on the supporting portions 25*b* of the turning members 25, and the opening portions 22*b* are provided in the front ends of the rod member 22 has been described, the present disclosure is not limited to this. The rod member 22 only has to be configured to be separated from the attachment unit 23 in a case where force acts on the accommodating portion from the outer side to the inner side of the accommodating portion. For example, a configuration is possible in which protruding shapes are formed on the front ends of the rod member 22 in directions of facing the supporting portions 25*b* of the turning members 25, and opening shapes corresponding to the protruding shapes are formed in the supporting portions 25*b*.

Second Embodiment

In the first embodiment, the example in which the rod member 22 elastically deforms about the fulcrum and is separated from the attachment unit 23 in a case where force is applied to the rod member 22 from the outer side to the inner side has been described. In the present embodiment, an example in which a rod member 22 that is expandable and contractable is used, so that the rod member 22 is thus separated from the attachment units 23 in a case where force is applied to the rod member 22 from the outer side to the inner side is described.

Figure 11A:
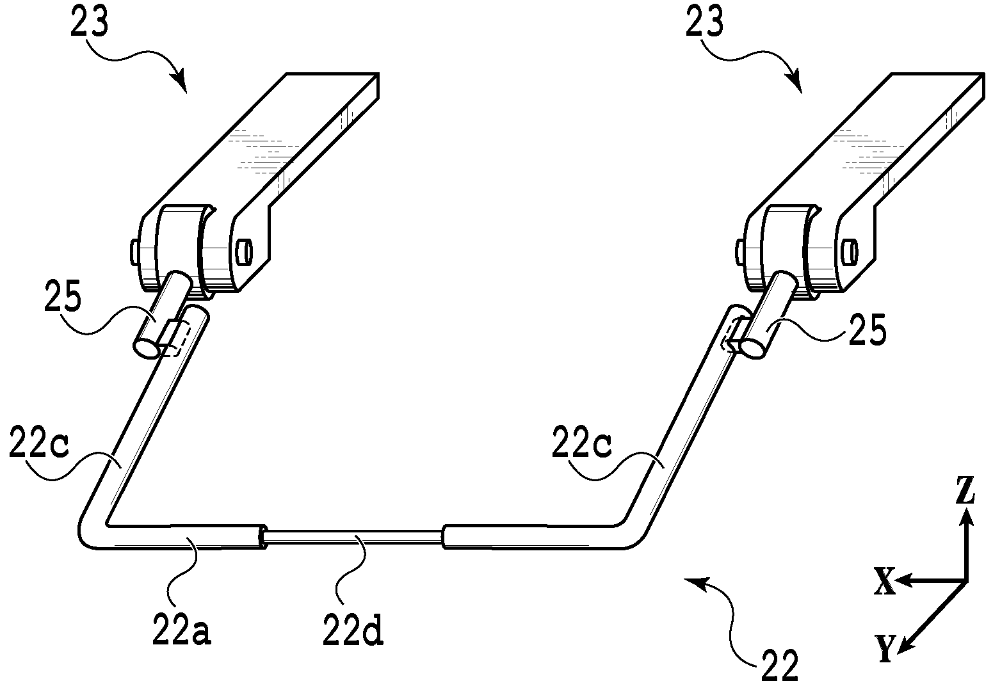
FIGS. 11A and 11B are each a perspective view showing a rod member and attachment units.
Figure 11B:
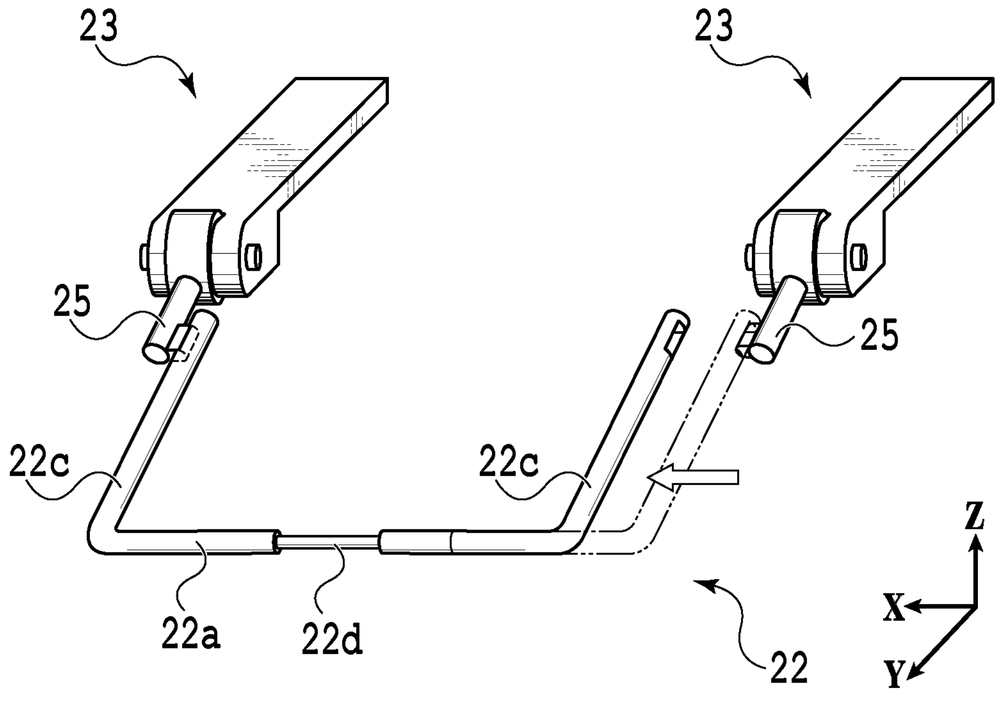
Figure 12A:
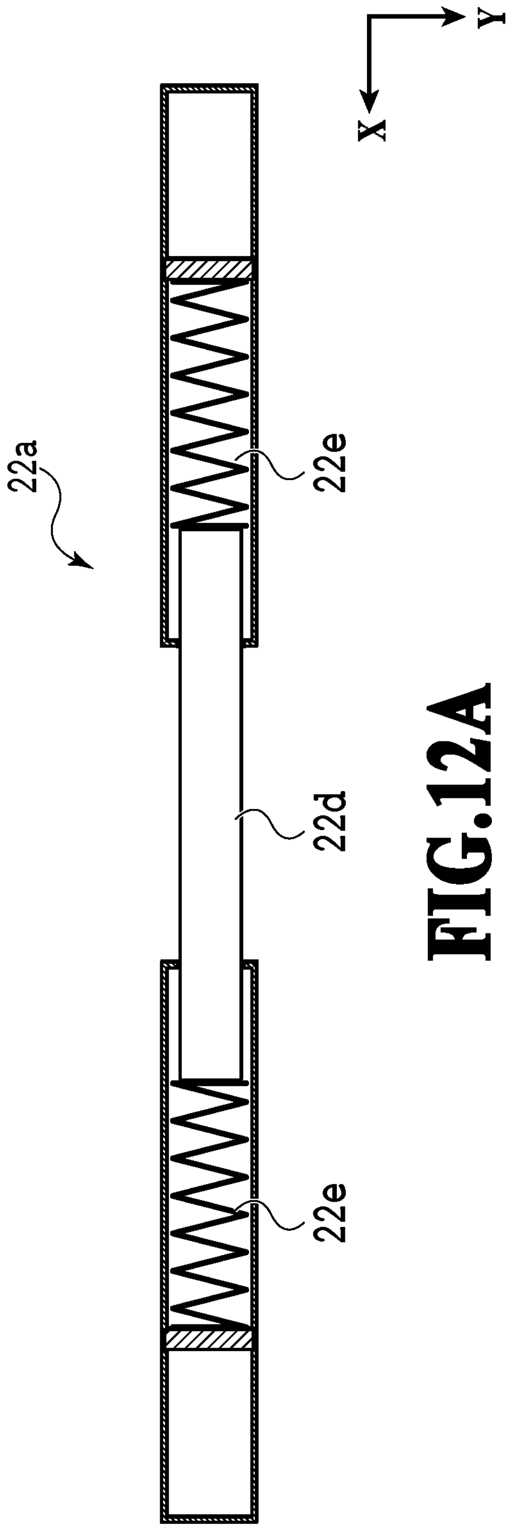
FIGS. 12A and 12B are each a diagram for explaining the rod member.
Figure 12B:
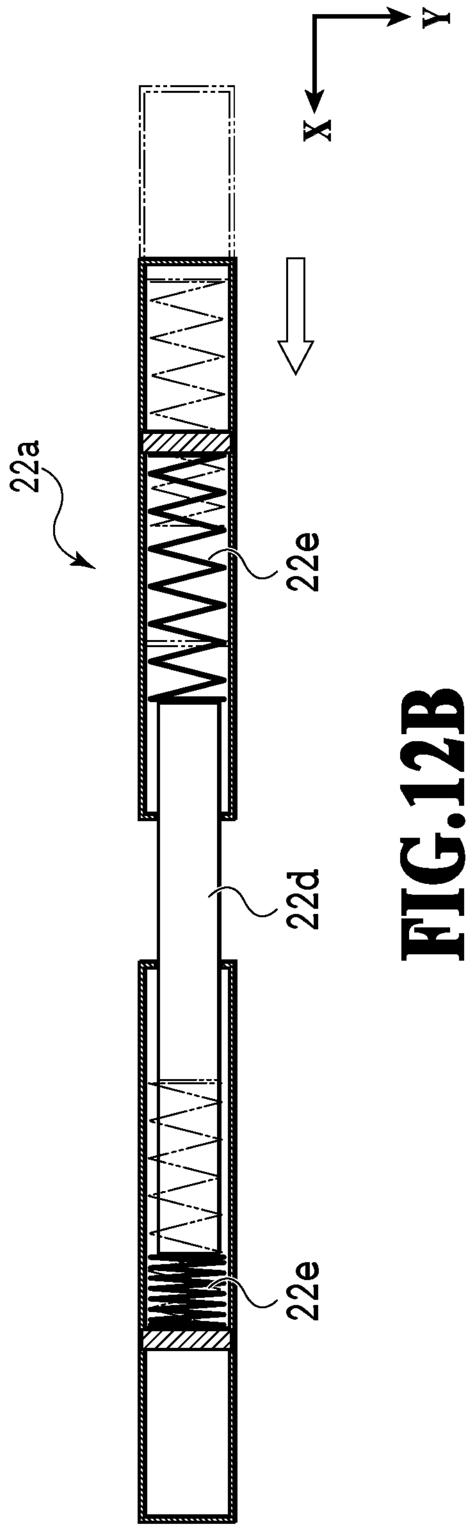

FIGS. 11A and 11B are each a perspective view showing a rod member 22 and attachment units 23 of the present embodiment. FIGS. 12A and 12B are each a diagram for explaining the rod member 22. The rod member 22 of the present embodiment is described by using FIGS. 11A and 11B and FIGS. 12A and 12B. Note that since the basic configurations are the same as those in the example described in the first embodiment, differences are mainly described here.

The rod member 22 of the present embodiment includes an expandable and contractable portion 22*d* which is expandable and contractable in a holding portion 22*a*. The expandable and contractable portion 22*d* is configured to contract in a case where force is applied to the rod member 22 from the outer side to the inner side, and to return to the original shape when the force is released. FIG. 11A is a diagram of a state where the rod member 22 is attached to the attachment units 23. FIG. 11B shows an example in which the expandable and contractable portion 22*d* contracts to separate the front end of the rod member 22 from the attachment unit 23 in a case where force is applied to the rod member 22 in the direction of arrow.

FIG. 12A shows the state of the holding portion 22*a* in a state where the rod member 22 is attached to the attachment unit 23, and FIG. 12B shows the state of the holding portion 22*a* in a case where force is applied in the direction of arrow. A rod having a different diameter is contained as the expandable and contractable portion 22*d* near the center of the holding portion 22*a* of the rod member 22. In addition, spring members 22*e* are arranged at both sides of the expandable and contractable portion 22*d*. The length of the expandable and contractable portion 22*d* appearing outside changes as the spring members 22*e* are deformed.

As described above, according to the present embodiment, part of the holding portion 22*a* of the rod member 22 is configured to be expandable and contractable. For this reason, in a case where force is applied to the rod member 22 from the outer side to the inner side, the rod member 22 contracts, so that the rod member 22 is separated from the attachment unit 23. Hence, in a case where the user collides with the accommodating portion, it is possible to suppress occurrence of breakage in the attachment unit 23 or the rod member 22.

Other Embodiments

Although in the above-described embodiments, the examples of the sheet member in which the receiving member for receiving the printing medium is formed of a cloth have been described, the present disclosure is not limited to this. Any material may be used as long as the member can be attached to the rod member 22 and the printer 10, and takes on a substantially U shape due to its weight in use as viewed from the side face.

In addition, although in the above-described embodiments, the examples in which the attachment units 23 include the turning members 25 have been described, a configuration which does not use the turning members 25 is also possible. That is, a configuration is possible in which the positions of the holding portions 22*a* of the rod members 22 are not turned to the turn positions but the holding portions 22*a* are located at predetermined positions. In this case, the attachment units 23 also only have to be configured such that the rod member 22 can be attached to the printer 10. That is, the attachment units 23 only have to be in such a mode that the attachment units 23 are provided at positions outside the desk 11, which is the ground face, and the rod member 22 is attached to the attachment unit 23. For example, protruding shapes may be formed on the attachment units 23 so that the rod member 22 is fixedly located at a position, which serves as such a discharge position as described in the first embodiment. Then, the opening portions of the rod member 22 are formed to fit to the protruding shapes, making it possible to attach the rod member 22 at a desired discharge position. In addition, in a case where the printing medium accommodating apparatus is not used, the rod member 22 may be removed from the attachment unit 23 by applying force to the rod member 22 from the outside.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-017843, filed Feb. 8, 2022, which is hereby incorporated by reference wherein in its entirety.

What is claimed is:

1. A printing medium accommodating apparatus for stacking printing media discharged from a discharge port of a printing apparatus, the printing medium accommodating apparatus comprising:

a receiving member configured to receive a printing medium discharged from the discharge port in a discharge direction;

a holding member having a holding portion configured to hold one end of the receiving member in the discharge direction; a first attachment unit configured to be attached to the printing apparatus and configured to enable connection with the holding member; and a second attachment unit configured to be capable of attaching an opposite end of the receiving member on an opposite side to the one end in the discharge direction to the printing apparatus, wherein the first attachment unit includes a turning member that is rotatable about a rotation axis, the turning member being configured to turn while holding an end portion of the holding member, wherein the first attachment unit includes a pressing member configured to press a side surface of the turning member in a direction crossing the rotation axis, wherein the turning member is held at a selected rotational position by friction between the pressing member and the turning member, and wherein the holding member transitions from a first state where the holding member is connected with the first attachment unit to a second state where the holding member is separated from the first attachment unit.

2. The printing medium accommodating apparatus according to claim 1, wherein deformation of the holding member causes the holding member to transition from the first state to the second state.

3. The printing medium accommodating apparatus according to claim 1, wherein the holding member has the holding portion and a connecting portion configured to be connected with the first attachment unit, and deformation of a joint portion between an end portion of the holding portion and the connecting portion causes the holding member to transition from the first state to the second state.

4. The printing medium accommodating apparatus according to claim 1, wherein the holding portion is configured to be expandable and contractable, and expansion and contraction of the holding portion cause the holding member to transition from the first state to the second state.

5. The printing medium accommodating apparatus according to claim 1, wherein a pair of the first attachment units are attached near the discharge port, and in a state where the holding member is connected with each of the pair of first attachment units, in a case where force containing a component in a first direction which is, as viewed from one of the pair of first attachment units, directed to an opposite one of the pair of first attachment units is applied to the holding member, the holding member transitions from the first state to the second state.

6. The printing medium accommodating apparatus according to claim 5, wherein in a case where force containing a component in a second direction opposite to the first direction is applied to the holding member, the holding member does not transition from the first state to the second state.

7. The printing medium accommodating apparatus according to claim 1, wherein the receiving member is capable of deforming with a weight thereof, and in a state where the receiving member is attached to the first attachment unit and the second attachment unit, the receiving member takes on a substantially U shape.

8. The printing medium accommodating apparatus according to claim 1, wherein the first attachment unit further includes a spring member configured to bias the pressing member against the turning member.

9. The printing medium accommodating apparatus according to claim 1, wherein the pressing member includes a sliding member configured to press the side surface of the turning member, the sliding member including a restricting face configured to restrict the sliding member from turning together with the turning member.

10. The printing medium accommodating apparatus according to claim 1, wherein the first attachment unit includes an insertion member configured to be inserted into the printing apparatus, the insertion member including an abutting portion provided at a lower portion of the insertion member, and wherein, in a state where the first attachment unit is attached to the printing apparatus, a portion of the abutting portion is positioned below the printing apparatus.

11. The printing medium accommodating apparatus according to claim 10, wherein the abutting portion is configured to abut a desk that supports the printing apparatus.

12. A printing apparatus comprising:

a discharge port;

a printing medium accommodating apparatus for stacking printing media discharged from the discharge port, the printing medium accommodating apparatus including:

a receiving member configured to receive a printing medium discharged from a discharge port of the printing apparatus in a discharge direction;

a holding member having a holding portion configured to hold one end of the receiving member in the discharge direction; a first attachment unit configured to be attached to the printing apparatus and configured to enable connection with the holding member; and a second attachment unit configured to be capable of attaching an opposite end of the receiving member on an opposite side to the one end in the discharge direction to the printing apparatus, wherein the first attachment unit includes a turning member that is rotatable about a rotation axis, the turning member being configured to turn while holding an end portion of the holding member, wherein the first attachment unit includes a pressing member configured to press a side surface of the turning member in a direction crossing the rotation axis, wherein the turning member is held at a selected rotational position by friction between the pressing member and the turning member, and wherein the holding member transitions from a first state where the holding member is connected with the first attachment unit to a second state where the holding member is separated from the first attachment unit; and an insertion slot configured such that the first attachment unit is attached to the insertion slot.

13. The printing apparatus according to claim 12, wherein deformation of the holding member causes the holding member to transition from the first state to the second state.

14. The printing apparatus according to claim 12, wherein the holding member has the holding portion and a connecting portion configured to be connected with the first attachment unit, and deformation of a joint portion between an end portion of the holding portion and the connecting portion causes the holding member to transition from the first state to the second state.

15. The printing apparatus according to claim 12, wherein the holding portion is configured to be expandable and contractable, and expansion and contraction of the holding portion cause the holding member to transition from the first state to the second state.

16. The printing apparatus according to claim 12, wherein a pair of the first attachment units are attached near the discharge port, and in a state where the holding member is connected with each of the pair of first attachment units, in a case where force containing a component in a first direction which is, as viewed from one of the pair of first attachment units, directed to an opposite one of the pair of first attachment units is applied to the holding member, the holding member transitions from the first state to the second state.

17. The printing apparatus according to claim 16, wherein in a case where force containing a component in a second direction opposite to the first direction is applied to the holding member, the holding member does not transition from the first state to the second state.

18. The printing apparatus according to claim 12, wherein the first attachment unit further includes a spring member configured to bias the pressing member against the turning member.

19. The printing apparatus according to claim 12, wherein the pressing member includes a sliding member configured to press the side surface of the turning member, the sliding member including a restricting face configured to restrict the sliding member from turning together with the turning member.

20. The printing apparatus according to claim 12, wherein the first attachment unit includes an insertion member configured to be inserted into the printing apparatus, the insertion member including an abutting portion provided at a lower portion of the insertion member, and wherein, in a state where the first attachment unit is attached to the printing apparatus, a portion of the abutting portion is positioned below the printing apparatus.

21. The printing apparatus according to claim 20, wherein the abutting portion is configured to abut a desk that supports the printing apparatus.

* * * * *